March 17, 1964 P. W. DUESLER 3,124,846
INTERLOCKING TRUSS
Filed Sept. 16, 1960 5 Sheets-Sheet 1

INVENTOR
PAUL W. DUESLER
BY
ATTORNEY

March 17, 1964 P. W. DUESLER 3,124,846
INTERLOCKING TRUSS
Filed Sept. 16, 1960 5 Sheets-Sheet 2

INVENTOR
PAUL W. DUESLER
BY
ATTORNEY

March 17, 1964 P. W. DUESLER 3,124,846
INTERLOCKING TRUSS
Filed Sept. 16, 1960 5 Sheets-Sheet 3

INVENTOR
PAUL W. DUESLER

BY
ATTORNEY

March 17, 1964 P. W. DUESLER 3,124,846
INTERLOCKING TRUSS
Filed Sept. 16, 1960 5 Sheets-Sheet 4

*INVENTOR*
PAUL W. DUESLER

BY
ATTORNEY

March 17, 1964    P. W. DUESLER    3,124,846
INTERLOCKING TRUSS

Filed Sept. 16, 1960    5 Sheets-Sheet 5

*INVENTOR*
PAUL W. DUESLER

BY

ATTORNEY

United States Patent Office 3,124,846
Patented Mar. 17, 1964

3,124,846
INTERLOCKING TRUSS
Paul W. Duesler, 3455 W. Beltline Highway,
Madison, Wis.
Filed Sept. 16, 1960, Ser. No. 56,453
3 Claims. (Cl. 20—.5)

This invention relates to a truss panel for use in the construction of floors, walls, roofs and other like parts of buildings such as homes. More specifically this invention relates to an interlocking truss panel having all the properties of rigidity necessary to withstand bending stresses that are encountered in such buildings.

This invention concerns a relatively inexpensive and simple way of manufacturing a truss panel which is of relatively light weight and is resistant to both high tensile and shearing stresses. By utilizing a plurality of effectually interlocking webs which have non-interlocking flanges as the essential elements, I provide a structural truss panel unit which is highly resistant to both bending and shearing under high loads. By placing two flanges of a beam on either side of a web so that the greater part of area of the beam is as far from the neutral axis as possible, the section modulus of the beam is increased. Increasing the section modulus of a beam reduces the amount of unit stress in the beam for a given bending moment so that for a given force applied to the beam, the unit stress developed in the beam is less than that in a beam of constant cross-sectional area. Each structural unit of the truss panel constructed in accordance with this invention is a beam comprising two such "flanges" and a web and consequently the truss panel will withstand very high flexural forces.

Because the flanges extend from one side of the panel to the other without any interruption or joint in any flange, the flanges have the greatest strength possible for such members and the panel has a very high strength/weight ratio.

It may heretofore have been proposed to provide panels wherein a plurality of members in each face of the panel provide flanges to cooperate with webs in the interior of the panel or to cooperate with material in the interior of the panel which serves the function of a web or webs. But the plurality of members on each face have been brought together at a plurality of joints so that the strength of the members has been no greater than the strength of the weakest of such joints. I have found that by making the flanges of the beams in my invention non-interlocking and substantially continuous, that is, having each of the flanges extend past each other at each of the joints between webs so that each flange extends across the entire structural panel unit, that a truss panel is formed that is easy to construct and has a high rigidity, so as to be resistant to lateral and flexural loads.

Another feature of this invention is to construct a truss by an easy and simple method whereby parts of the structural unit of the truss of this invention may be partially shop constructed, thus making assembly of the truss at the construction site of buildings and homes a relatively simple matter.

An object of this invention is to provide a relatively simple, strong and stable truss panel for use in roofs and ceilings of homes and other buildings.

A further object of this invention is to provide a truss panel that is highly resistant to bending stresses.

A further object of this invention is to provide a relatively inexpensive truss panel for use in floors, walls and roofs which has a high strength/weight ratio.

A further object of this invention is to provide an easily constructable truss panel for roofs and ceilings of buildings.

A further object of this invention is to provide a method of assembling structural wall and roof panels at the construction sites of buildings.

A further object of this invention is to provide a truss panel for use in walls, floors and roofs of buildings which can be efficiently interlocked with other such panels at joints in such manner that there is no diminution of strength in the wall, floor or roof at such a joint.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
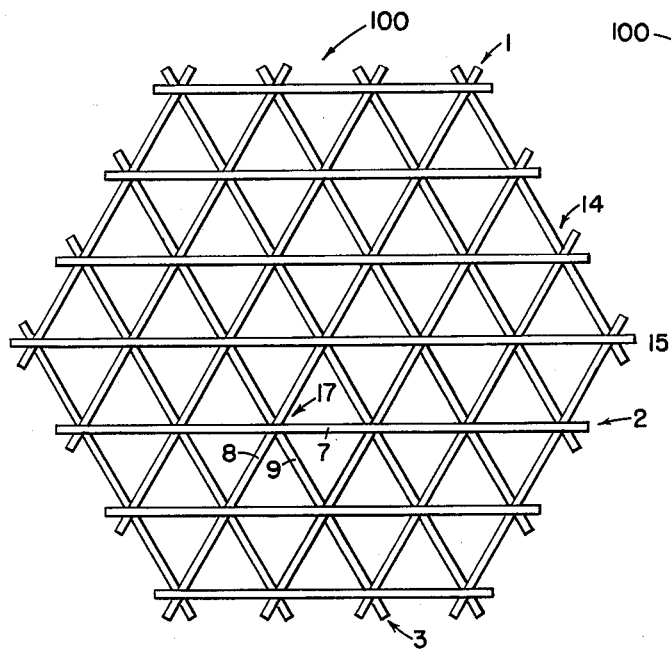
FIGURE 1 is a plan view of one embodiment of a truss panel in accordance with the invention.

Referring to FIGURES 1, 2, 3 and 4, each inner joint of the panel designated broadly as 100, may be considered as a joint between three beams such as beams 1, 2 and 3 joined together at an intersecting point at joint 17. The three beams 1, 2 and 3 comprise interlocking webs 4, 4', 5, 5', 6, 6', webs 4 and 4' being part of beam 1, webs 6 and 6' being part of beam 2, webs 5 and 5' being part of beam 3. At the bottom and top edges of webs 4, 4', 5, 5', 6, 6' are attached non-interlocking flanges 7, 7', 8, 8', 9, 9' respectively, the primes representing the bottom flanges. The beams 1, 2 and 3 intersect at angles of sixty degrees. Webs 4, 4', 5, 5', 6 and 6' of beams 1, 2, 3 are all joined together at intersection 17 by member 12. Flanges 7, 7', 8, 8' and 9, 9' do not intersect each other at intersection 17 but extend continuously past and through the flanges being in different horizontal planes.

At the edges of the structural panel unit 100 edge joints are formed which are designated broadly as 14 and which will be discussed later. At the corners of the structural unit are corner joints 15 which also will be discussed later. The panel of FIGURES 1 and 2 consists essentially of a plurality of flanges corresponding to those previously enumerated, and extending parallel respectively thereto, passing over each other at a plurality of joints corresponding to joint 17 and also to joint 14 and 15, the flanges being joined by a plurality of web members corresponding to those previously enumerated.

A panel may be assembled in accordance with the invention by applying glue or any suitable adhesive to all or most of the faying surfaces and pressing the parts together. Generally it is preferred to clamp each pair of top and bottom flanges together against the web members separating them until the adhesive dries or sets. It is particularly important that the flanges be adhered one to another at each joint, by application of adhesive at faying surfaces between flanges as at 21, 22, 23 and 24 in FIGURE 4.

It can be seen that there are many different sequences in which the parts may be joined to one another. Preferably all parts are pre-cut to precisely the correct size prior to assembly. Assembly may be accomplished either in a shop or on the construction site. Each web member may have the same dimensions and shape, to simplify assembly. The various web members may be easily fitted into the flanges as a first step in assembly. The truss panel may be partly shop constructed by carrying out this step in a shop so that all of the bottom or top flanges are provided with webs of equal length inserted at equal spaced intervals along a flange. Then, at the site of construction, it is only necessary to complete the assembly.

It can also be seen that the web joiner may be made large enough so that the webs do not need notches in their ends to provide clearance for flanges of beams other than those to which the web members are joined.

Many other variations may be made in constructing the panels. Glue or other adhesive need not be applied at joints 21, 22, 23 and 24 but may be applied only to some of such joints or even to none of them, although a much weaker panel will result.

Ordinary hoof glue may be used or any suitable structural adhesive may be used. Such adhesives may include thermoplastic and thermosetting resins such as ureaformaldehyde, melamine formaldehyde, phenol formaldehyde, polyvinyl chloride, butadiene styrene copolymers, polymers and copolymers of ethyl acrylate, methyl methacrylate and methacrylic acid.

Figure 5:
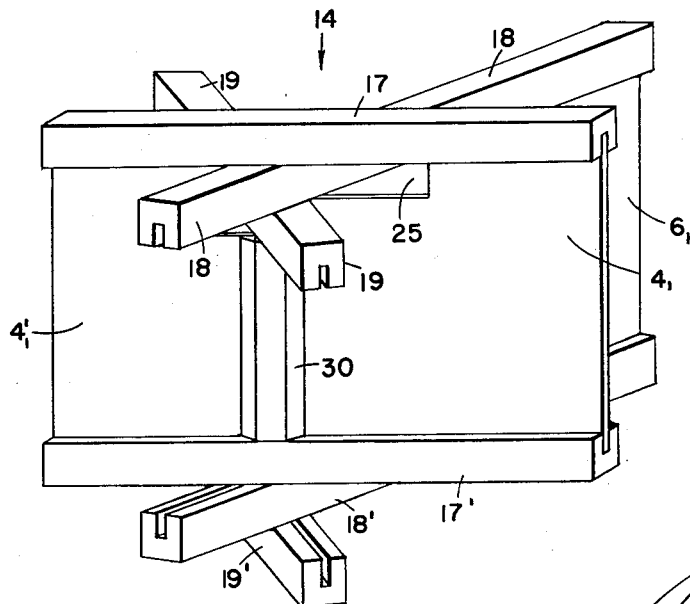
FIGURE 5 is a perspective view of a joint at one edge of the panel of FIGURES 1 and 2.

The edge joint of FIGURE 5 is similar to joint 17 except that no webs such as webs 5' 6' are inserted between flanges 18, 18' and 19, 19' respectively. Web joiner 30, unlike web joiner 12, may have only four slots rather than the six slots of web joiner 12, since member 30 only joins webs $4_1$, $4_1'$, $5_1$ and $6_1$. Webs $4_1$ and $4_1'$ are cut away as at 25 to provide room for two other flanges to be inserted through the cut-out portion. This construction allows the edge joints (such as joint 14) of one unit to be united with a similar joint of another hexagonal unit so that many or few hexagonal structural units can be attached together to form one integral wall, roof or floor. Thus as shown in FIGURE 6, joint 14 of panel unit 100 is joined to corresponding joint 14' of another similar or identical truss panel unit.

In the connection of joints 14 and 14', each of the flanges of joint 14' contacts the side of each of the corresponding flanges of joint 14. Thus, flange 18 of joint 14 lies alongside and in contact with flange 28 of joint 14'. Each of the six flanges of joint 14 is attached by suitable means to each corresponding flange of joint 14' against which it lies. As suitable means for such attachment there may be used adhesive, bolts or nails.

Figure 6:
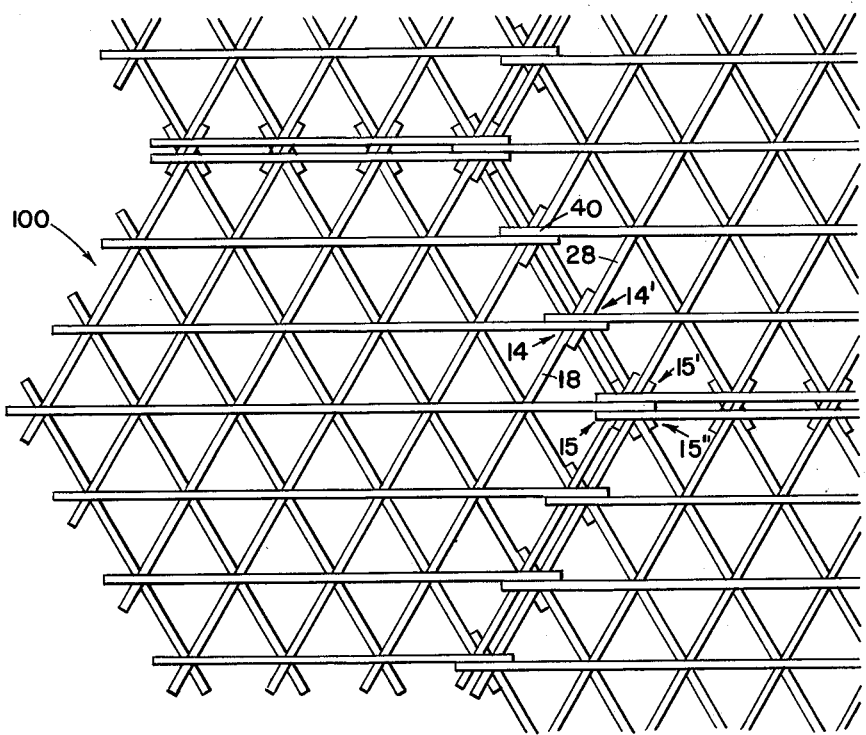
FIGURE 6 is a top view of the panel of FIGURE 1 and portions of three adjacent similar panels, showing how the panels may be joined.

Joint 15 of panel 100 may be joined to corresponding joints 15' and 15" of two adjacent identical or similar panels in a manner similar to the joining of joints 14 and 14', the manner in which each flange of each joint is joined to corresponding flanges of each of the other joints being apparent from FIGURE 6.

Each joint thus made between panels may have a strength equal to or greater than that of a joint such as joint 14. Thus the strength of the wall, roof or floor formed from the panels is not lower at the joints between panels than at other places.

In such a manner an extremely rigid slab-like unit of exceptional lightness is constructed. The truss panels of the invention are usually constructed of wood, but materials such as asbestos cement board or metal may be used for some or all of the members.

Figure 2:
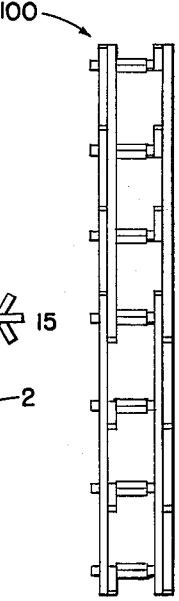
FIGURE 2 is a side view of the embodiment of FIGURE 1.
Figure 3:
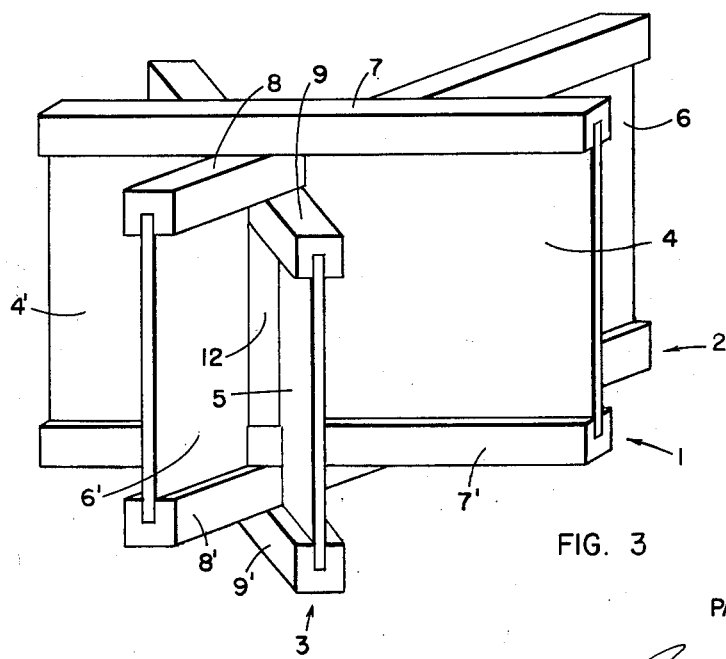
FIGURE 3 is a perspective view of a joint in the structural truss panel of FIGURE 1.
Figure 4:
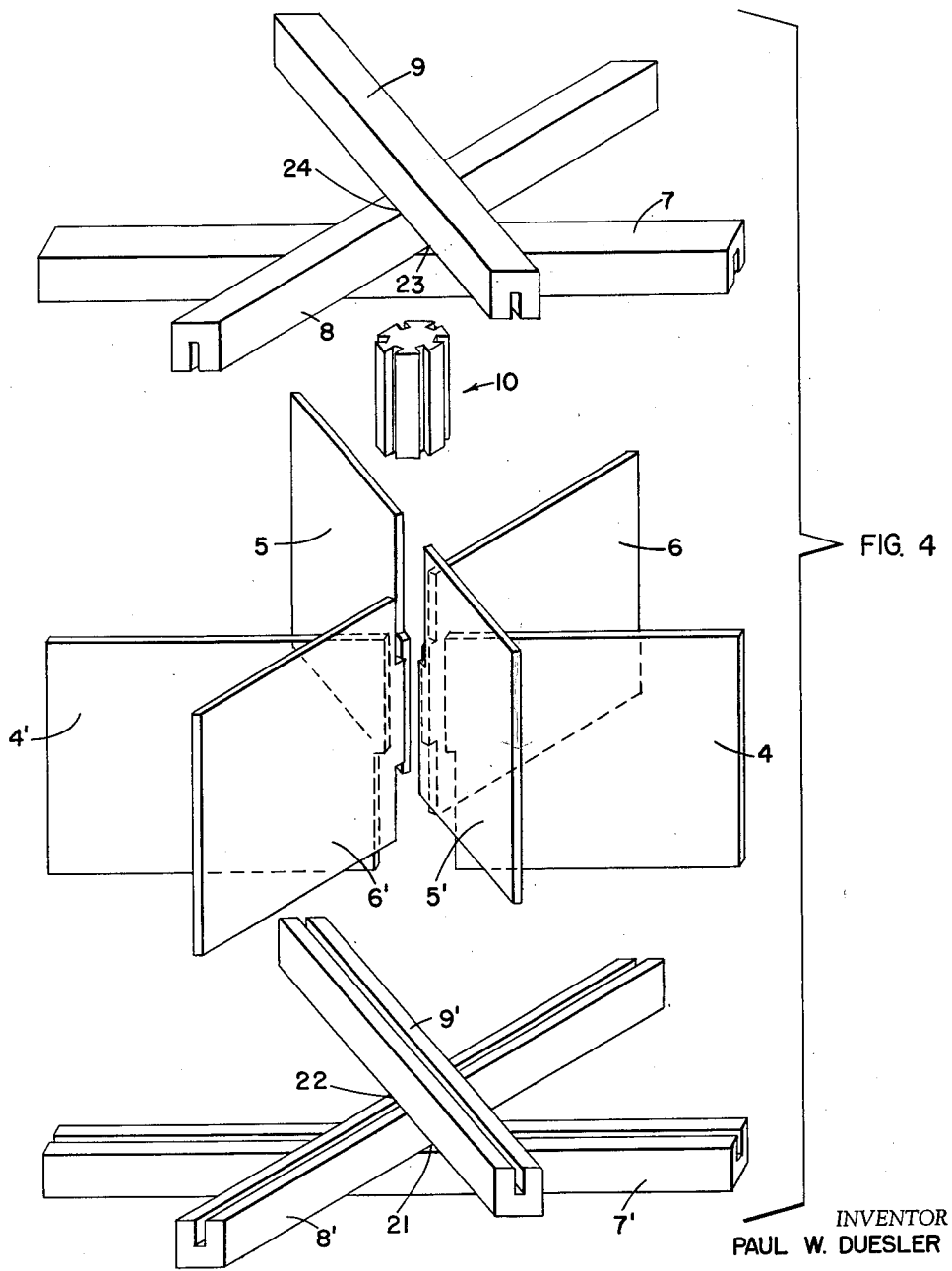
FIGURE 4 is a perspective "blown-apart" view of the joint of FIGURE 3.

As can be seen from FIGURES 1, 2 and 3, each beam of the truss panel unit resembles an I-beam. By use of this construction the greatest part of the cross-sectional area is as far from the neutral axis as practicable so as to give a relatively high section modulus. Hence by elementary principles of strength of materials, the unit stress developed in this type of beam will be lower for a given bending movement than in a conventional flat beam of equal and uniform cross-sectional area. Thus by this construction, the material is distributed in each beam of the structural panel unit so that the panel best resists tension, flexural and compression forces acting upon it.

Referring now to FIGURES 7–11, an embodiment is shown wherein the beams in each panel cross each other at 90° rather than at 60° as in the embodiment of FIGURES 1–5. In the panel, a plurality of members are joined to provide, in effect, a plurality of beams such as beams 61 and 62, which come together or intersect at joint 60, although the flanges of the beams extend past each other rather than intersecting each other. Thus beam 61 comprises two web members 63 and 63' inserted between two flanges 66 and 66' and beam 62 comprises two web members 64 and 64' inserted between two flanges 65 and 65'. The web members are joined to one another by being attached to member 67.

Figure 7:
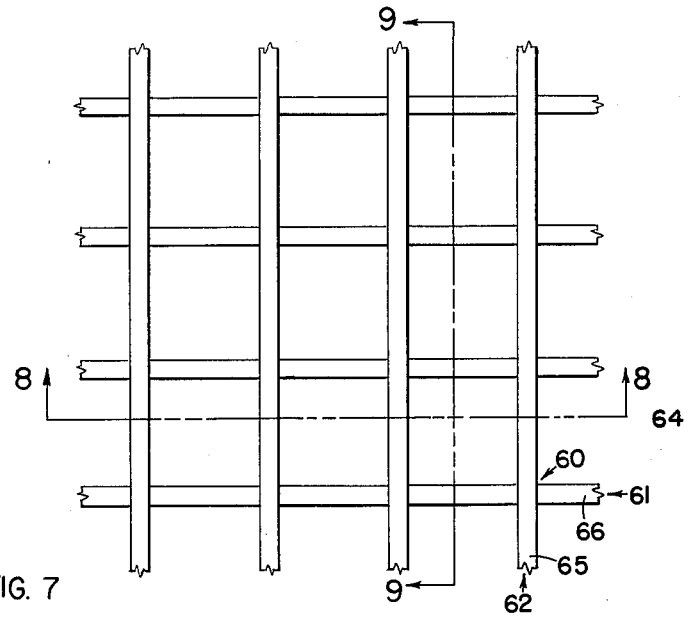
FIGURE 7 is a plan view of another embodiment of a portion of a truss panel unit in accordance with the invention.
Figure 9:
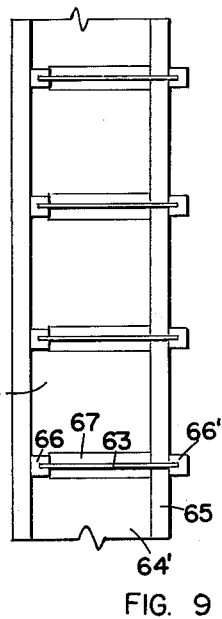
FIGURE 9 is a cross-sectional view taken on lines 9—9 in FIGURE 7.
Figure 8:
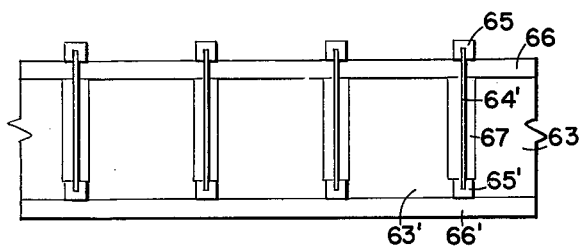
FIGURE 8 is a cross-sectional view taken on lines 8—8 in FIGURE 7.
Figure 10:
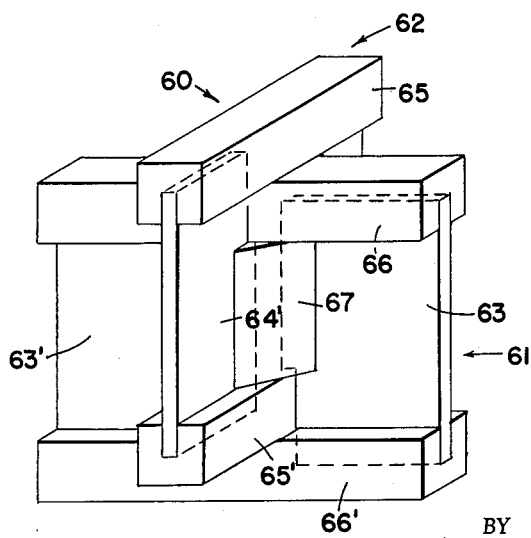
FIGURE 10 is a fragmentary perspecitve view of one joint in the panel of FIGURE 7.

As can be seen from FIGURE 7, each flange extends across the entire structural unit.

Figure 11:
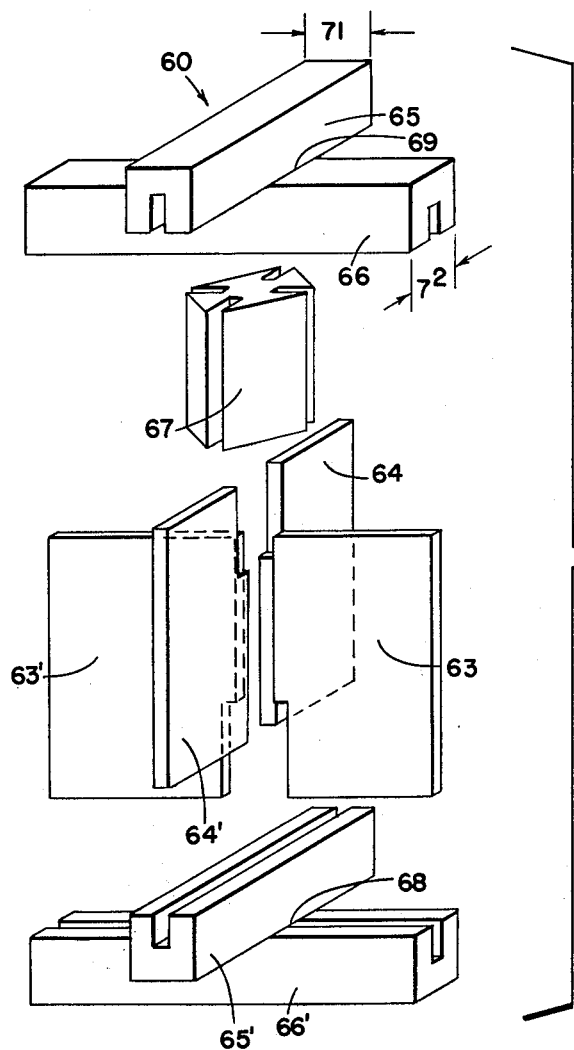
FIGURE 11 is a perspective "blown-apart" view of the joint of FIGURE 10.

Referring now to FIGURE 11, the panel may be assembled by following a procedure for each joint which I will now describe only with respect to one joint.

FIGURE 7 shows the construction of a joint 60. Glue may be first applied in the groove of flange 66', notched webs 63 and 63' may then be inserted in groove 66', leaving a space between the notches of the webs equal to the width 71 of flanges 65 and 65'. Then adhesive may be placed in the groove of flange 65' and notched webs 64 and 64' may be inserted in the groove, spaced at a distance of the width 72 of flanges 66 and 66'. Webs 64 and 64' and flange 65' may then be threaded through the notches of webs 63 and 63' with glue being applied at 68, which is the place of contact between flanges 66' and 65'. Then adhesive may be placed in all the grooves of web joiner 67 which may then be inserted between the webs 63, 63' and 64, 64', each web fitting into a groove. Glue may then be applied to the grooves of flanges 65 and 66; flange 66 is then placed upon webs 63 and 63' and flange 65 is placed on webs 64 and 64', adhesive having first been applied at 69 where the two flanges contact.

Any type of glue or adhesive may be used and the drying or curing time will vary depending upon the material that is used. During drying or curing, the unit may be clamped together. It can also be seen that in accordance with this invention a roof, floor or wall can be formed from a plurality of structural units such as the one shown in FIGURE 7, the units being assembled in a manner similar to that shown in FIGURE 6.

An entire wall, floor or roof may consist of only one structural panel unit in accordance with the invention, since the panel unit may be made of any size. Thus a wall, floor or roof need not consist of a member of small panel units, each comprising, say, 48 flange members, but may consist of a single large panel unit comprising for example 900 flange members. The panels need not be any particular shape at all if they are not to be joined to other panels. Thus a single large panel made in accordance with the embodiment of FIGURE 1 and constituting an entire roof might have the form of a parallelogram or a trapezoid.

As is apparent from the above description, it is also possible to unite a square unit to a hexagonal unit by use of the appropriate joints. It is also possible to vary the shape of the truss units such as to be triangular and rectangular in shape rather than hexagonal or square as shown in the above specific embodiments.

It is also apparent that metal reinforcing rods may be used in either or both flanges of the beam but for many building purposes the benefit due to the increased resistance to tension and compression stresses will not be increased sufficiently to offset the cost of such construction.

Just as web joiner 12 may be made larger to obviate need for notches in web members such as members 4, 4′, 5, 5′, 6, 6′, web joiner 67 may be made larger so that notches are not necessary in web members such as 63, 63′, 64, 64′ to provide clearance for the flanges.

Use of web joiners such as members 12, 30 and 67 is preferred but they may be omitted and a suitable, though weaker, panel will be thereby provided. If they are omitted, it is more important to make certain that excellent adhesion is provided between flanges as at 21, 22, 23, 24, 68 and 69.

In place of grooved web joiners of the form shown, there may suitably be used any sort of member which will serve as a column to hold in vertically spaced apart relationship the flanges which are held in such relationship in the manner shown in the figures by the web joiner members shown in the figures.

This invention embodies a simply constructed interlocking truss that is both rigid and light in weight so as to be easily supportable and convenient to use in all types of buildings.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A structural building panel comprising a plurality of intersecting beams, each beam comprising two corresponding upper and lower parallel flange members and a plurality of web members lying in a single plane extending between said flange members in each beam so as to form the inside portion of said beam, each flange member being continuous throughout the length of the beam, each of said intersecting beams intersecting others of said beams at spaced intersection points, said points being spaced substantially the length of one of said web members, at least two of said beams intersecting at each of said points, the beams intersecting at each point so that the flanges of the intersecting beams lie in different horizontal planes, each of said beams intersecting the other beams at each of said intersection points so that one of said flanges of each intersecting beam passes between the flanges of each beam with which it intersects at said intersection point and the other flange of each intersecting beam passes outside of the corresponding upper and lower flanges of each of the other intersecting beam with which it intersects at said intersection point.

2. A structural building panel comprising a plurality of intersecting beams, each beam comprising two corresponding upper and lower parallel flange members and a plurality of web members lying in a single plane extending between said flange members in each beam so as to form the inside portion of said beam, said web members being of equal length and equal height, the distance between the upper and lower flanges of each beam being the same, each flange member being continuous throughout the length of the beam, each of said intersecting beams intersecting others of said beams at spaced intersection points, said points being spaced substantially the length of one of said web members, at least two of said beams intersecting at each of said points, the beams intersecting at each point so that the flanges of the intersecting beams lie in different horizontal planes, each of said beams intersecting the other beams at each of said intersection points so that one of said flanges of each intersecting beam passes between the flanges of each beam with which it intersects at said intersection point and the other flange of each intersecting beams passes outside of the corresponding upper and lower flanges of each of the other intersecting beams with which it intersects at said intersection points, said intersection points being devoid of vertical support.

3. A portion of a building comprising a plurality of interlockedly joined structural units, each of said structural units comprising a plurality of intersecting beams, each beam comprising upper and lower parallel flange members and a plurality of web members lying in one plane extending between said flange members in each beam so as to form the inside portion of said beam, each flange member being continuous throughout the length of the beam, said web members being of equal height and length, the distance between the upper and lower flanges of each beam being equal, each of said intersecting beams intersecting others of said beams at spaced intersection points along each of said beams, said spaced intersection points being devoid of vertical support and formed only by the intersection of said intersecting beams, said webs of said intersecting beams being joined at each intersection point by a joiner, said intersection points being spaced substantially the length of one of said web members, at least two of said beams intersecting at each of said points, the beams intersecting at each intersection point so that the flanges lie in different horizontal planes, each of said beams intersecting the other beams at said intersection points so that one of said flanges of each intersecting beams passes between the flanges of each beam with which it intersects at said intersection points and the other flange of each of said intersecting beams passes the outside of the corresponding upper and lower flanges of each of the other intersecting beams which it intersects at said intersection points, each of said units interconnected with other like units by means of a series of joints positioned at the outer extremities of said structural units.

References Cited in the file of this patent

UNITED STATES PATENTS

| 213,595 | Thorp | Mar. 25, 1879 |
| 2,284,898 | Hartman | June 2, 1942 |
| 2,607,450 | Horowitz | Aug. 19, 1952 |
| 2,655,881 | Lenke | Oct. 20, 1953 |
| 2,740,335 | Greulich | Apr. 3, 1956 |

FOREIGN PATENTS

| 166,683 | Australia | Jan. 26, 1956 |